(12) United States Patent
Nicolai et al.

(10) Patent No.: US 11,085,623 B2
(45) Date of Patent: Aug. 10, 2021

(54) POWER CABLE MICRO-JUNCTION-BOX FOR A STRIP LIGHT ARRAY

(71) Applicant: Apogee Lighting Holdings, LLC, Deer Park, NY (US)

(72) Inventors: Richard Nicolai, St. James, NY (US); Frank Zarcone, Smithtown, NY (US); Michael Boyd, Sayville, NY (US); Fred Katz, Hauppauge, NY (US)

(73) Assignee: APOGEE LIGHTING HOLDINGS, LLC, Deer Park, NY (US)

( * ) Notice: Subject to any disclaimer, the term of this patent is extended or adjusted under 35 U.S.C. 154(b) by 0 days.

(21) Appl. No.: 16/984,693

(22) Filed: Aug. 4, 2020

(65) Prior Publication Data
US 2020/0363050 A1 Nov. 19, 2020

Related U.S. Application Data

(63) Continuation of application No. 16/786,263, filed on Feb. 10, 2020, now Pat. No. 10,753,589, which is a
(Continued)

(51) Int. Cl.
*H02G 3/08* (2006.01)
*F21V 23/06* (2006.01)
*H01R 9/24* (2006.01)
*H02G 3/16* (2006.01)
*F21S 4/20* (2016.01)
(Continued)

(52) U.S. Cl.
CPC ............... *F21V 23/06* (2013.01); *F21S 4/20* (2016.01); *F21V 23/001* (2013.01); *H01R 9/2408* (2013.01); *H01R 9/2416* (2013.01); *H02G 3/083* (2013.01); *H02G 3/16* (2013.01);
(Continued)

(58) Field of Classification Search
CPC .......... H02G 3/08; H02G 3/081; H02G 3/083; H02G 3/16; H02G 3/18; H02G 3/086; H02G 5/00; H02G 5/066; H01R 9/2408; H01R 9/2416; H01R 9/24; H01R 9/22; H01R 4/36; H01R 4/34; F21Y 2103/10; F21Y 2115/10; F21S 4/20; F21V 23/06; F21V 23/001
USPC ..... 174/50, 520, 549, 559, 560, 561, 59, 60, 174/149 B; 220/3.2–3.9, 4.02; 361/600, 361/601; 439/535, 536, 709, 708, 715, 439/724
See application file for complete search history.

(56) References Cited

U.S. PATENT DOCUMENTS 3,033,913 A * 5/1962 Dietze ................ H02G 3/16
174/60
3,617,612 A * 11/1971 Patton ................ H02G 3/16
174/59
(Continued)

*Primary Examiner* — Angel R Estrada
(74) *Attorney, Agent, or Firm* — Tutunjian & Bitetto, P.C.

(57) ABSTRACT

A junction box includes a bottom portion including a first end portion and a second end portion and a top portion configured to mate with the bottom portion. The top and bottom portions form a first opening to receive a first cable at the first end portion and form a second opening to receive a second cable at the second end portion. Interchangeable connection blocks are included for receiving wires of different gauges to make connections between the first cable and the second cable. A connection block receiving-feature is formed in the bottom portion to secure the connection blocks.

19 Claims, 17 Drawing Sheets

Related U.S. Application Data continuation of application No. 15/948,472, filed on Apr. 9, 2018, now Pat. No. 10,557,623.

(60) Provisional application No. 62/502,209, filed on May 5, 2017.

(51) Int. Cl.
    *F21V 23/00*     (2015.01)
    *H01R 4/36*      (2006.01)
    *F21Y 103/10*    (2016.01)
    *F21Y 115/10*    (2016.01)

(52) U.S. Cl.
    CPC ....... *F21Y 2103/10* (2016.08); *F21Y 2115/10* (2016.08); *H01R 4/36* (2013.01)

(56) References Cited

U.S. PATENT DOCUMENTS

| | | | | |
|---|---|---|---|---|
| 3,848,224 A * | 11/1974 | Olivero | H02G 3/16 174/59 |
| 4,195,194 A * | 3/1980 | Kuster | H01R 4/2462 174/59 |
| 4,243,834 A * | 1/1981 | Logioco | H02G 15/076 174/38 |
| 5,145,388 A * | 9/1992 | Brownlie | H01R 4/5008 174/60 |
| 5,684,274 A * | 11/1997 | McLeod | H01R 4/70 174/138 F |
| 5,844,171 A * | 12/1998 | Fitzgerald | H02G 15/113 174/92 |
| 5,934,930 A * | 8/1999 | Camps | H01R 12/61 439/425 |
| 6,186,838 B1 * | 2/2001 | Foster | H01R 13/508 174/59 |
| 6,220,893 B1 * | 4/2001 | Stephan | H01R 4/30 439/519 |
| 6,265,670 B1 * | 7/2001 | Duesterhoeft | H02G 3/083 174/152 G |
| 6,333,464 B1 * | 12/2001 | Ellison | H01R 4/30 174/138 F |
| 6,527,598 B1 * | 3/2003 | Opel | H01R 9/2408 439/709 |
| 7,109,416 B1 * | 9/2006 | Reed | H02G 15/113 174/481 |
| 7,256,350 B2 * | 8/2007 | Stagi | H02G 1/14 174/92 |
| 8,471,145 B2 * | 6/2013 | Suzuki | H05K 5/0226 174/50 |
| 8,684,762 B2 * | 4/2014 | Levi | H01R 4/2408 439/425 |
| 8,764,211 B2 * | 7/2014 | Fredrickson | B60R 16/0239 362/85 |

* cited by examiner

POWER CABLE MICRO-JUNCTION-BOX FOR A STRIP LIGHT ARRAY

TECHNICAL FIELD

The present invention is in the field of lighting engineering. The present invention is a device for interfacing heavy armored BX cable or non-armored Romex™ or other type of cable with the fine wires that are used to power up a light emitting diode (LED) strip light lighting element. The present invention serves as a tiny junction box that mechanically provides for connecting different size wires such as the BX or Romex™ power or other mains cable to the fine wires that are at the end of a length of the strip light in the field by an electrician. The junction box provides protection to the points of wire connection from liquids, conductive dust and other contaminants.

RELATED ART

Applications for lighting that were formerly implemented using fluorescent and incandescent lamps and were quite often connected to their power source via a large metal junction box where armored BX cable or Romex™ cable was manually connected to a pair of wires from the luminaire. As technology has moved forward to Light Emitting Diode (LED) products, the packaging of these LED elements is quite different from previous incandescent lamps. In many cases LEDs are mounted on a strip that can be many feet long and form a linear array of lighting not unlike fluorescent tubes. These linear arrays require an input of line voltage on their fine wires, where the LED current load is much less than incandescent or fluorescent power loads. The line voltage is conducted throughout the length of the array. The initial power input feed of these wires is quite often connected to an armored BX or Romex™ type power cable. The BX cable has a metal jacket that protects the two wires within from mechanical damage and from hazards such as rodents nibbling on the wires, whereas the Romex™ cable has a plastic jacket and may not be suitable for certain environments.

SUMMARY

A junction box includes a bottom portion including a first end portion and a second end portion and a top portion configured to mate with the bottom portion. The top and bottom portions form a first opening to receive a first cable at the first end portion and form a second opening to receive a second cable at the second end portion. Interchangeable connection blocks are included for receiving wires of different gauges to make connections between the first cable and the second cable. A connection block receiving-feature is formed in the bottom portion to secure the connection blocks.

Another junction box includes a bottom portion including a first end portion and a second end portion, and a top portion configured to mate with the bottom portion. The top and bottom portions form a first opening to receive a first cable at the first end portion and form a second opening to receive a second cable at the second end portion. Interchangeable connection blocks have at least two holes in each connection block for receiving wires of different gauges to make connections between the first cable and the second cable. A connection block receiving-feature is formed in the bottom portion to secure the connection blocks. The connection block receiving-feature includes a first wall for separating the connection blocks and a gapping feature that ensures a gap between the connection blocks and one of the first cable or the second cable.

Another junction box includes a bottom portion including a first end portion and a second end portion and a top portion configured to mate with the bottom portion. The top and bottom portions forming a first opening to receive a first cable at the first end portion and forming a second opening to receive a second cable at the second end portion. Interchangeable connection blocks for receiving wires of different gauges to make connections between the first cable and the second cable are included. A connection block receiving-feature formed in the bottom portion to secure the connection blocks.

Still another junction box includes a bottom portion including a first end portion and a second end portion, and a top portion configured to mate with the bottom portion. The top and bottom portions form a first opening to receive a first cable at the first end portion and forming a second opening to receive a second cable at the second end portion. Interchangeable connection blocks having at least two holes in each connection block for receiving wires of different gauges to make connections between the first cable and the second cable. A connection block receiving-feature formed in the bottom portion to secure the connection blocks, the connection block receiving-feature including a first wall for separating the connection blocks and a gapping feature that ensures a gap between the connection blocks and one of the first cable or the second cable.

DESCRIPTION OF THE DRAWINGS

The following description will provide details of preferred embodiments with reference to the following figures wherein.

DETAILED DESCRIPTION

Figure 1:
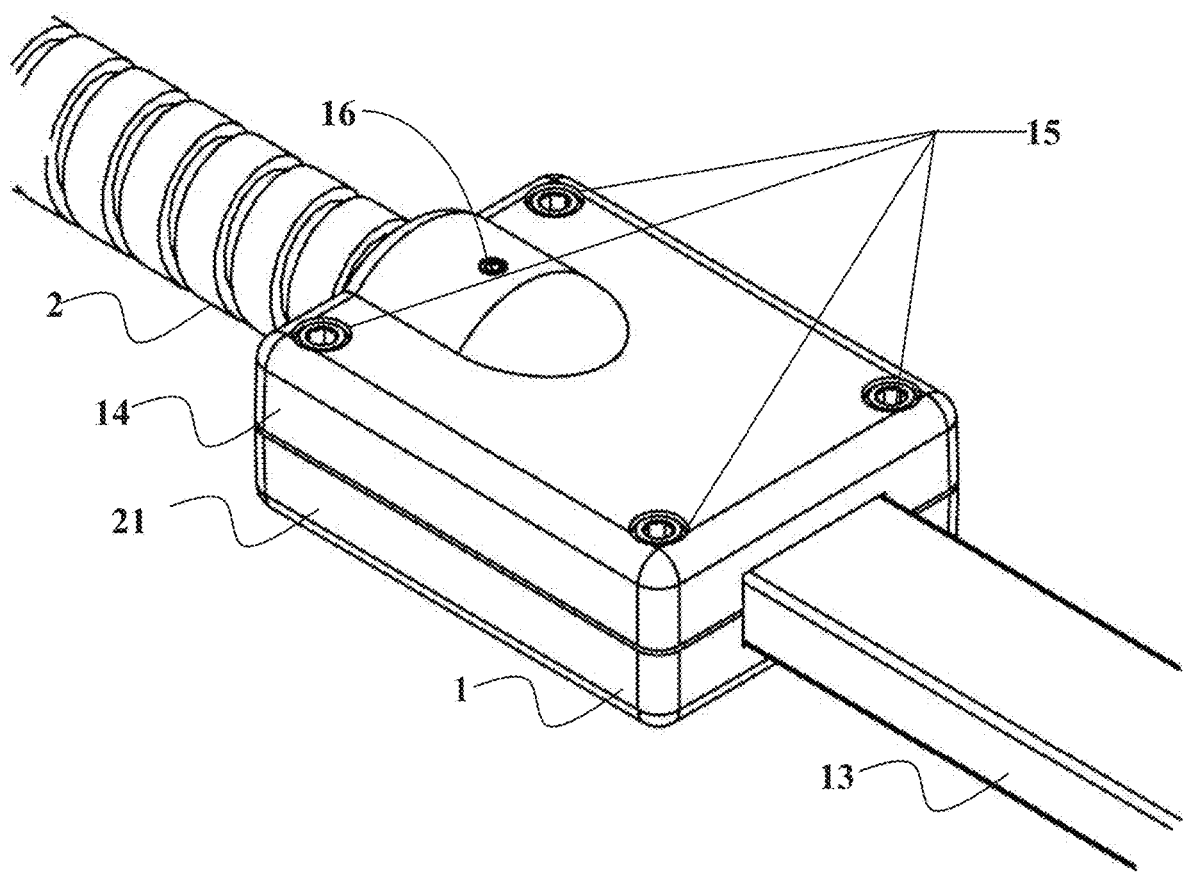
FIG. 1 is a perspective view of a straight entry version of a junction box with BX cable in accordance with one embodiment.

The present invention provides junction boxes for connecting a power cable to fine wires that feed an array of light emitting diodes (LEDs) and provides significant protection for this connection, both mechanically and from external environmental contamination. In one embodiment, a device is employed to connect an LED strip light array to AC mains via a cable, such as an armored BX cable or a plastic insulated power cable. A small micro-junction-box is provided to form the junction to avoid using conventional electrical connection hardware such as a full size metal or composition junction box. The LED strip light array can include extension wires soldered on to the end of the array. These wires run to the junction box where the wires are connected to a length of BX cable inside of the junction box. This includes mounting the junction box, adding extension wiring to the LED array, and bringing the BX cable into the junction box, using, e.g., circular clamps on the junction box to strain relieve the BX cable and also the cable from the light array. Once both pairs of wires are inside the junction box, they would have to be joined with wire nuts. Wire nuts work well when either wires of the same size are joined or when wires of close sizes are joined with the correct wire nut. In the case of the LED array, the wire size may be, e.g., 18 gauge (AWG). The BX cable could be 10-12 AWG. When these two differing sizes are joined with wire nuts, there can be a risk that the nuts will not fit on correctly and may fall off leaving the connection to get shorted to the ground of the metal junction box, which could be a fire risk.

With the hardware in accordance with aspect of the invention, metal blocks are fabricated for a specific size of the BX or Romex™ cable that will be encountered. The other hole in the block that connects to the LED array includes a fixed hole size designed to fit the wire coming off the LED array. An alternate to using different block sizes for different wires from BX or Romex™ cable includes using a soft metal ferrule, such as a tubular piece of copper over the cable's wire when a lighter cable gauge is used. This ferrule would be crimped to the cable's wire as a block fastening screw is tightened down. In this case, just one block size would be needed and just a supply of spare ferrules would be employed to customize the block to the wire size.

Both the wires from the LED array and the wires from the BX cable need to be cut to a pre-determined length and stripped to a pre-determined size. A BX cable termination cap can be placed over the end of the cable on a roughly trimmed metallic sheath's edge of the cable. The lower gasket can be positioned on the locating pegs. Four screws on the connection block can be backed out to permit for entry of a stripped wire to a connection block(s). The LED array can be put into a rectangular entry opening and the LED array wires can be placed into two outboard holes of two connection blocks. Outboard fastening screws can be tightened, and the BX cable's stripped wires can be fed in through a circular opening and fed into remaining two inboard holes on the blocks. Associated screws are tightened down to secure the stripped BX cable wires.

After the wires are connected, an upper gasket is lined up and the screws that hold the lower and upper parts of the box are secured in their holes. Depending on a material used for the box (e.g., plastic, metal, etc.), the holes can be pre-tapped to the screw's thread size, or the screw itself can be used as a tap into softer plastic and they would form their own thread as they are screwed in.

An alternative geometry for the metal connecting blocks can include two blocks rotated 90° (or a different angle) where there are two size holes drilled lengthwise on a same central axis. A long side of the blocks is parallel to the LED array. On one end, a hole for the LED array wire is drilled through the block, and at the other end, the hole size going through is larger to accommodate the BX cable wire. This would permit for a narrower package for the junction box. There can still be two fastening screws per block. This geometry would permit for the box to be narrower and pass through a smaller hole, in the event that it is desired to penetrate a wall and locate the box behind the wall. A flat sheet metal decorative plate, with a rectangular cutout could go over this hole and isolate the micro-junction-box behind the wall from where the luminaire is located.

The present embodiments provide for a rapid field installation of an LED strip light to a BX or Romex™ cable (or other cable type). The place of connection, which was previously a junction box, in older applications, can include a small, inconspicuous tiny box. If the LED strip array is provided with the micro-junction-box as a unit, the installation to a BX cable is just an exercise in stripping the cable to the correct lengths, inserting it into the blocks for the micro-junction-box. Then, two screws are tightened down, the gaskets and top and bottom of the box are put together and the box is sealed with the four screws.

It is to be understood that aspects of the present invention will be described in terms of a given illustrative architecture; however, other architectures, structures, materials and process features and steps can be varied within the scope of aspects of the present invention.

It will also be understood that when an element such as a layer, region or component is referred to as being "on" or "over" another element, it can be directly on the other element or intervening elements can also be present. In contrast, when an element is referred to as being "directly on" or "directly over" another element, there are no intervening elements present. It will also be understood that when an element is referred to as being "connected" or "coupled" to another element, it can be directly connected or coupled to the other element or intervening elements can be present. In contrast, when an element is referred to as being "directly connected" or "directly coupled" to another element, there are no intervening elements present.

Reference in the specification to "one embodiment" or "an embodiment", as well as other variations thereof, means that a particular feature, structure, characteristic, and so forth described in connection with the embodiment is included in at least one embodiment. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This can be extended, as readily apparent by one of ordinary skill in this and related arts, for as many items listed.

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Spatially relative terms, such as "beneath," "below," "lower," "above," "upper," and the like, can be used herein for ease of description to describe one element's or feature's relationship to another element(s) or feature(s) as illustrated in the Figures. It will be understood that the spatially relative terms are intended to encompass different orientations of the device in use or operation in addition to the orientation depicted in the Figures. For example, if the device in the Figures is turned over, elements described as "below" or "beneath" other elements or features would then be oriented "above" the other elements or features. Thus, the term "below" can encompass both an orientation of above and below. The device can be otherwise oriented (rotated 90 degrees or at other orientations), and the spatially relative descriptors used herein can be interpreted accordingly. In addition, it will also be understood that when a layer is referred to as being "between" two layers, it can be the only layer between the two layers, or one or more intervening layers can also be present.

It will be understood that, although the terms first, second, etc. can be used herein to describe various elements, these elements should not be limited by these terms. These terms are only used to distinguish one element from another element. Thus, a first element discussed below could be termed a second element without departing from the scope of the present concept.

Referring now to the drawings in which like numerals represent the same or similar elements and initially to FIG. 1, a straight entry embodiment of junction box 1 depicted with BX cable 2 is illustratively shown in accordance with an embodiment of the present invention. Entry of the BX cable 2 into the junction box 1 is secured by a screw 16 or other securing mechanism that secures the cable 2 and assists in strain relief and used to prevent the cable 2 from pulling out from the box 1. In some embodiments, the securing mechanism can include the use of tabs, set screws, friction fit, frictional connections, etc. On an opposite side, an LED linear array 13 enters the box 1. The box 1 is held together with four screws 15 in this embodiment, which when tightened help seal internal gaskets. Other securing mechanisms (e.g., snap fit, etc.) can also be employed.

Figure 2:
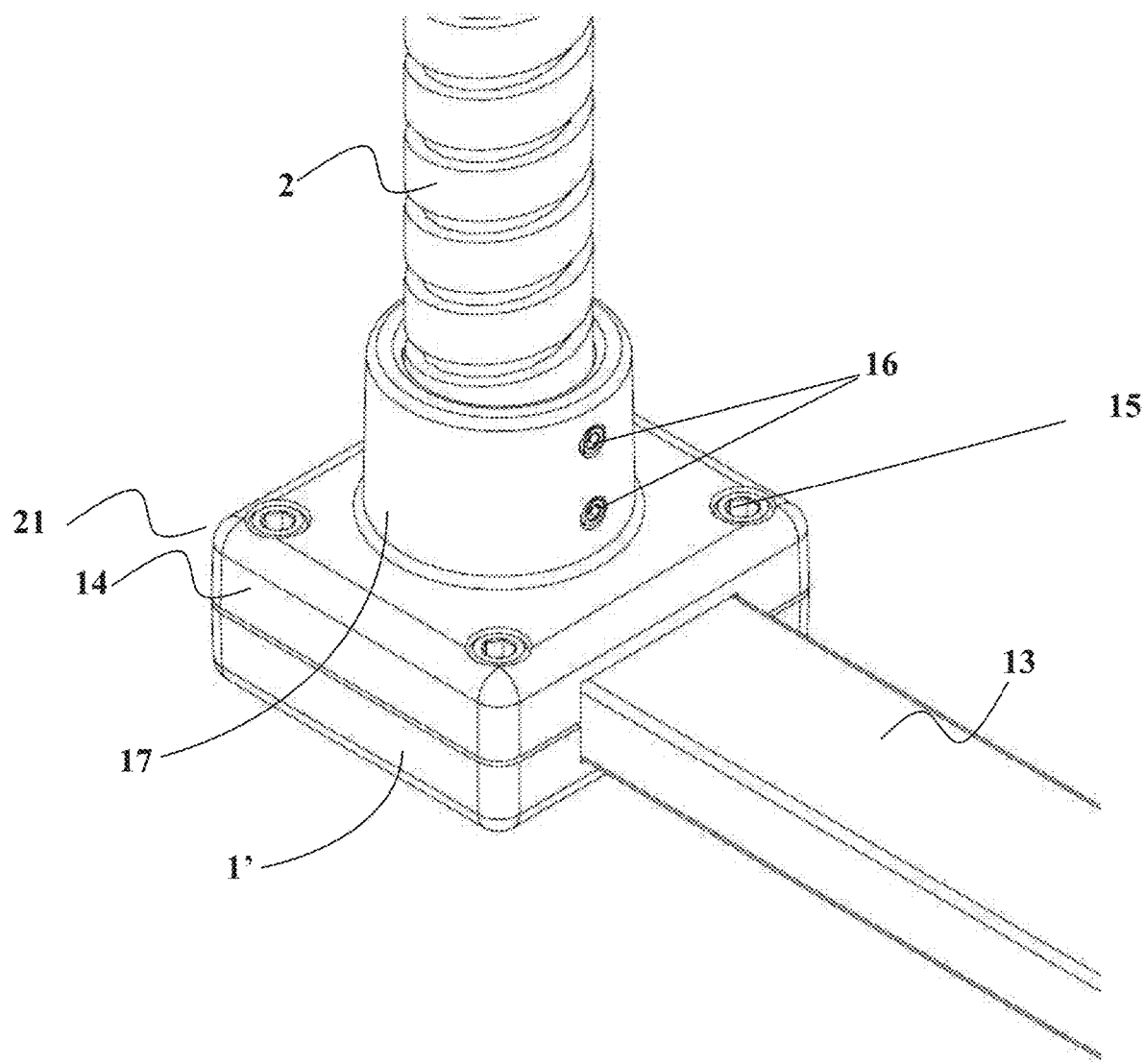
FIG. 2 is a perspective view showing a right angle entry junction box in accordance with another embodiment.

Referring to FIG. 2, a right angle entry embodiment is illustratively shown in accordance with another embodiment. The cable 2 enters a box 1' using a bushing 17 (e.g., plastic) that acts as a strain relief. Two securing screws 16 lock the BX cable 2 to the bushing 17. The spacing of these two screws 16 are set so that they go into a bottom grooving of the BX cable, which gives the cable strong retention capability. This version also illustratively includes four screws 16 to tightly lock the top 14 and a bottom 21 of the box together. Other securing mechanisms (e.g., snap fit, etc.) can also be employed.

Figure 3:
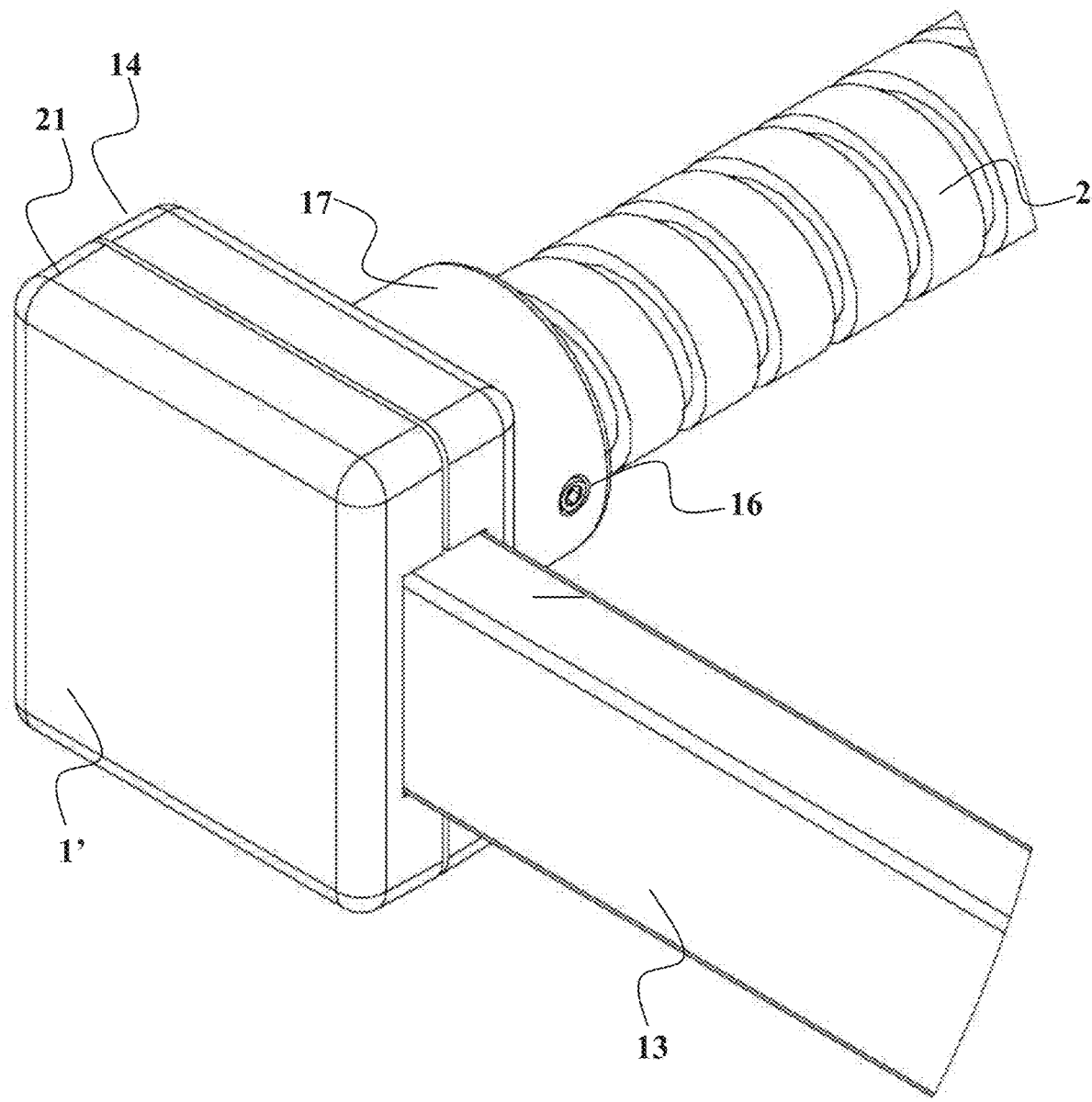
FIG. 3 is a bottom perspective view of the junction box shown in FIG. 2 in accordance with the embodiment.

Referring to FIG. 3, a bottom of the view of FIG. 2 is illustratively shown. The four box retention screws 15 do not go all the way through, as they terminate within cylinders within the box 1'.

Figure 4:
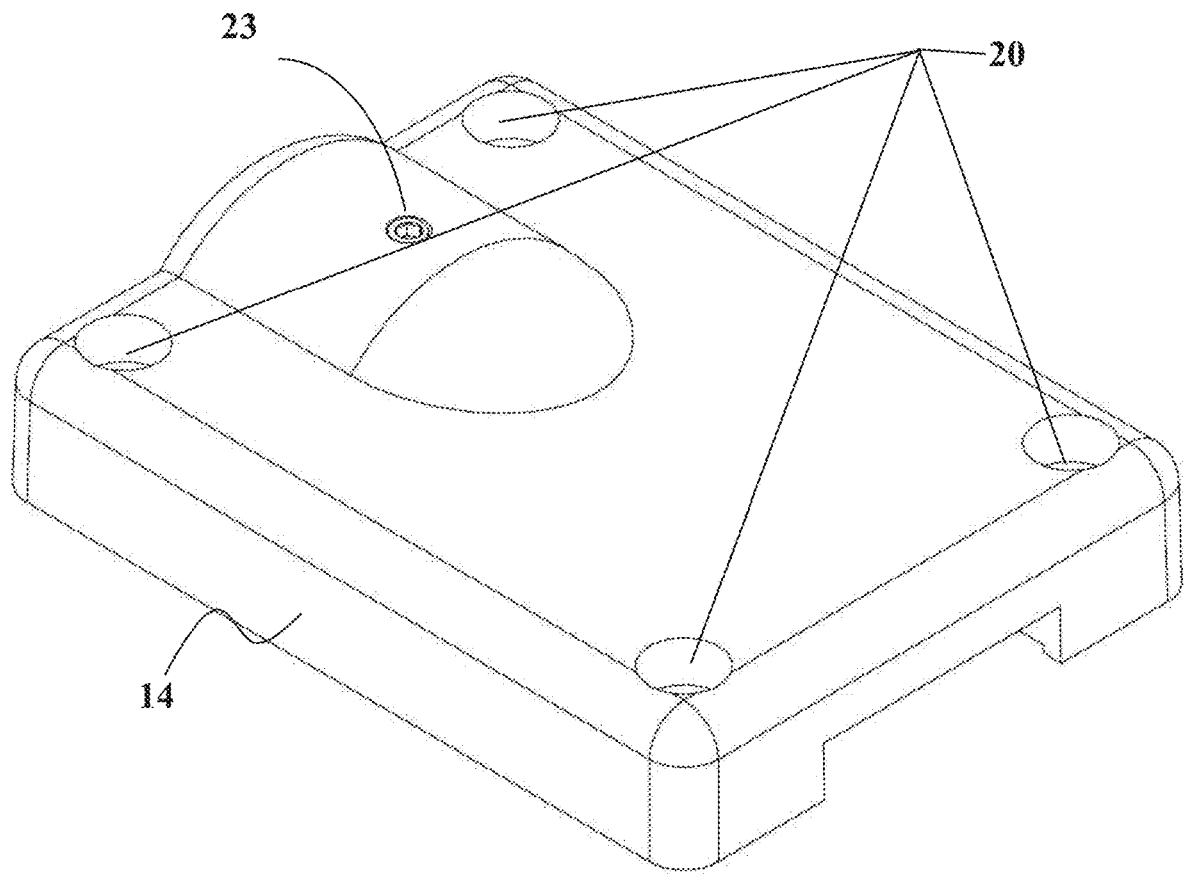
FIG. 4 is a perspective view of a micro-junction box top in accordance with another embodiment.

Referring to FIG. 4, a top 14 of the junction box 1 is illustratively shown. Four through-holes 20 are configured for the screws that join the top 14 to a bottom of the box. It should be understood that while a shape of the box is generally depicted as rectangular, other shapes and dimensions are contemplated.

Figure 5:
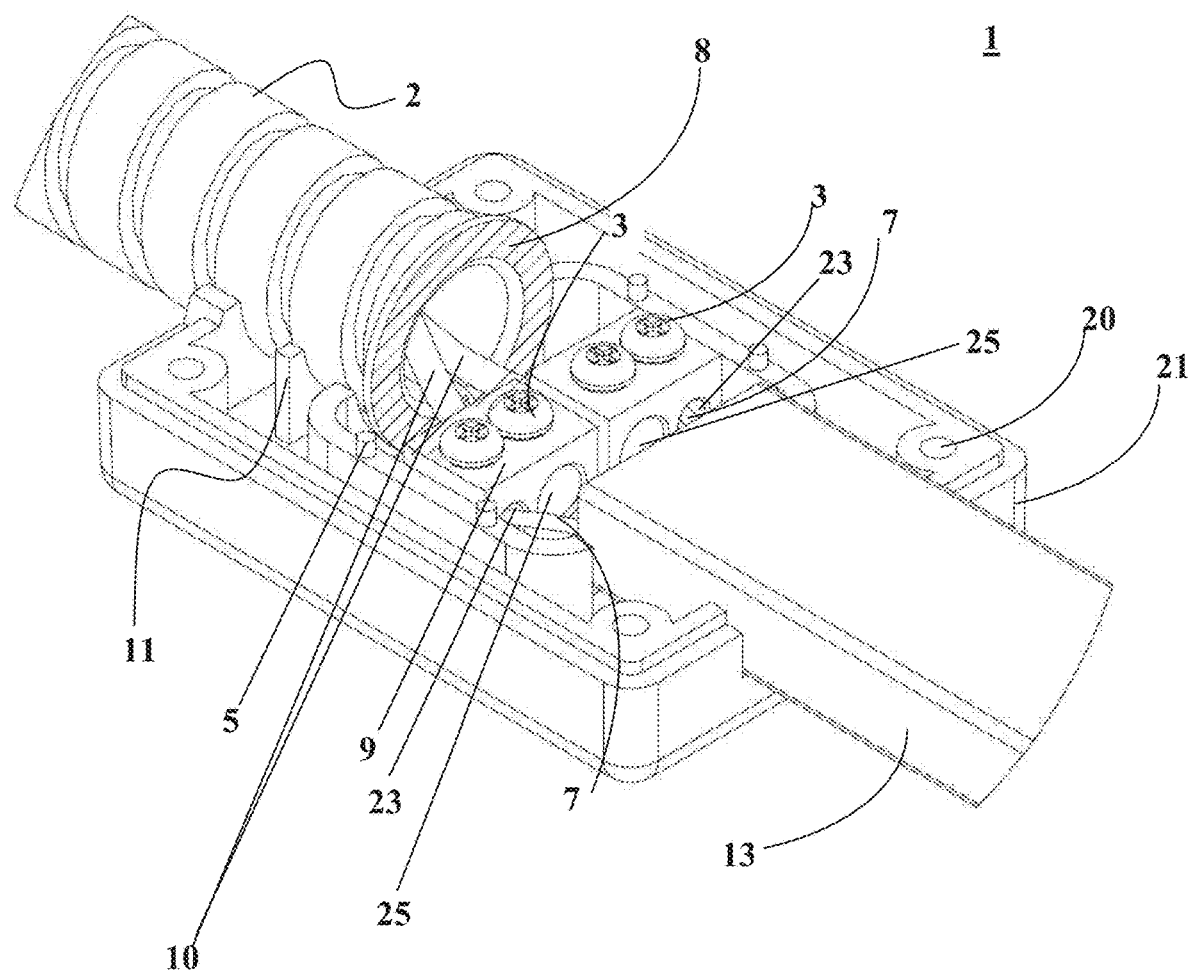
FIG. 5 is a perspective view of the straight entry version of the junction box of FIG. 1 with a cover removed in accordance with one embodiment.

Referring to FIG. 5, an interior view of the junction 1 is shown without the top and gaskets in the straight or parallel mounting configuration. At the end of the cable 2, a cable termination 8 is employed to terminate sharp ends of the cable 2 and prevent injury or damage to the inside of the box 1. The BX cable 2 rests on a semi-circular feature 11 of a box bottom 21 that provides a firm mount for the cable 2. There are two conductive (e.g., metal) blocks 9 that that connect to the wiring from the LED lighting strip 13. There are two holes 23 and 25 in each of these blocks 9 for wire insertion. One hole 25 is for one wire from the BX cable 10 and the other hole 23 is for a wire 7 from the LED lighting strip 13. The holes for the wires are not the same size, since the BX cable wire is of larger diameter. To retain the wires 10, 7 in the holes 25, 23, there are two retaining screws 3. The retaining screws 3 go into two threaded holes.

Figure 6:
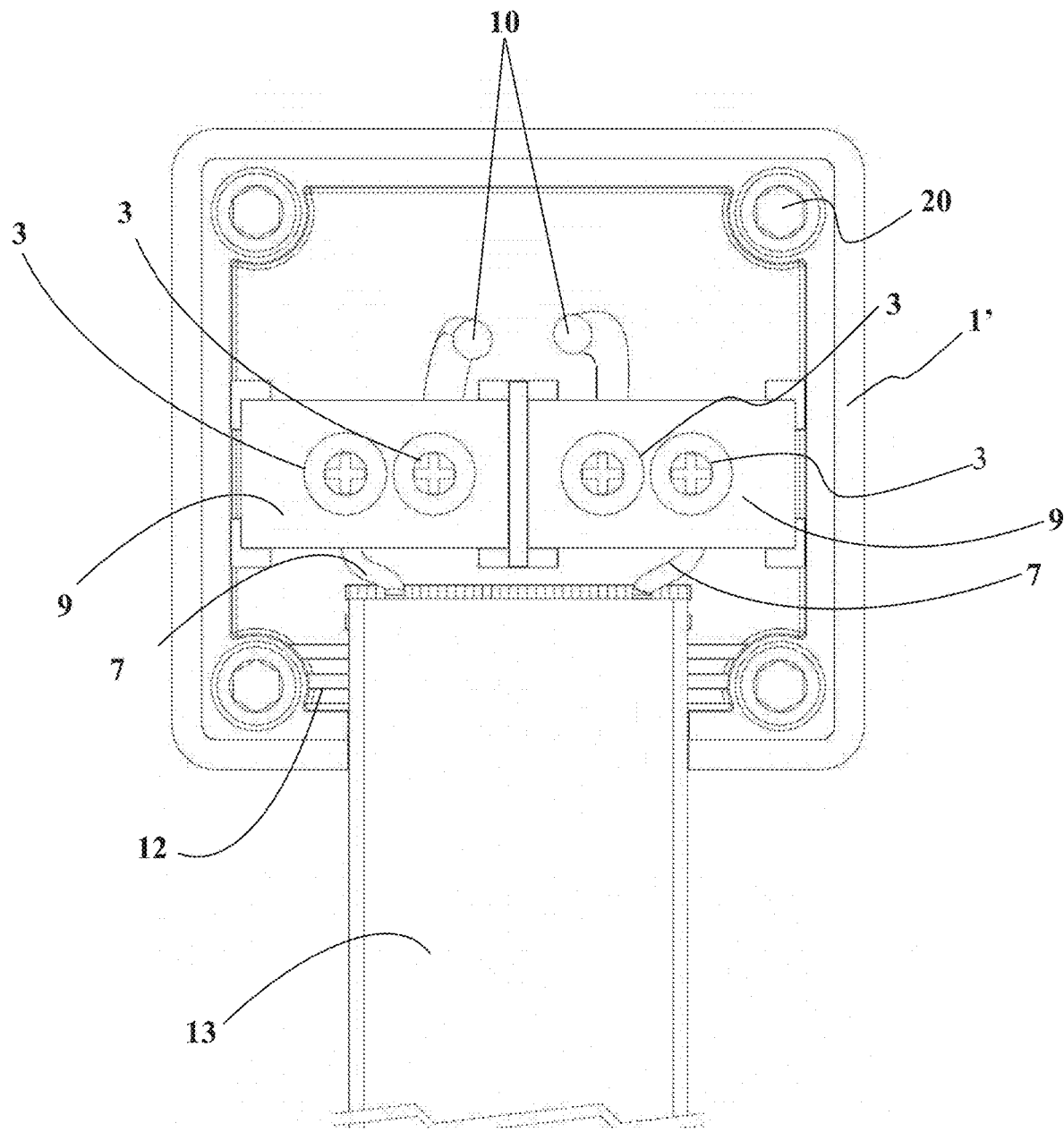
FIG. 6 is a top view of the right angle entry version of the junction box of FIG. 2 with the cover removed in accordance with one embodiment.
Figure 7:
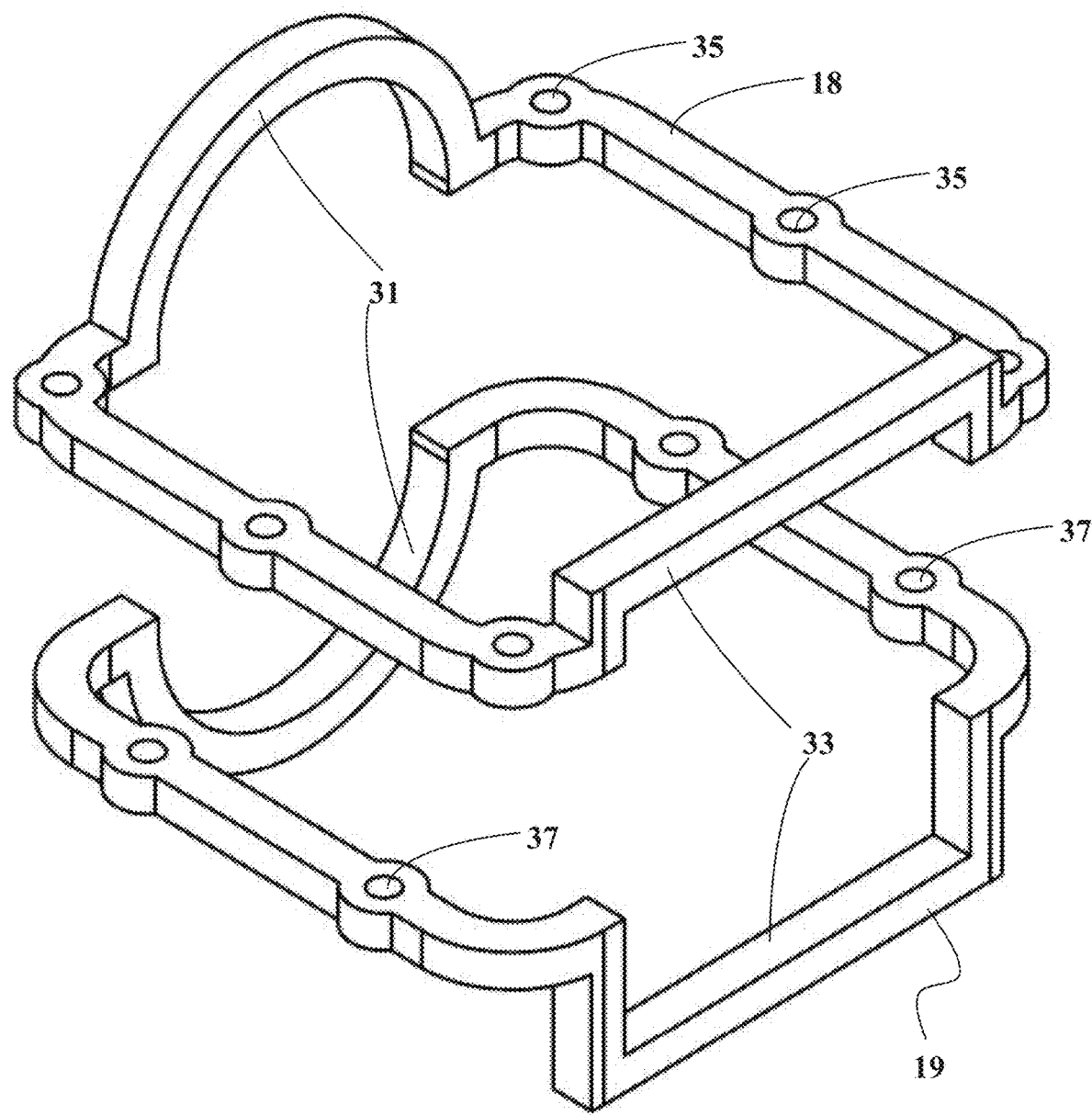
FIG. 7 is a perspective view showing rubber sealing gaskets for the straight entry version of the junction box of FIG. 1 in accordance with one embodiment.

An alternative to using the screws is to have a positive insertion feature on the blocks 9, where the wire just has to be pushed into the hole to make retentive contact, similar to the way a duplex outlet has set up as an alternative to screw terminals. Underneath the LED strip 13 near the screw holes 20 which cannot be seen in this view is a rough area of plastic 12 (FIG. 6). This rough area has good friction to retain the LED strip 13 once all of the screws are tightened down. It can also be seen that there are four pegs 5 that are used to retain a lower sealing gasket 19 which is shown in FIG. 7. The box top 14 has six pegs that secure an upper gasket 18 (FIG. 7) shown.

Referring to FIG. 6, a similar view as FIG. 5 is shown for the right angle junction box 1'. This view is looking down with the top cover being removed. The LED array strip 13 has two wires coming out of the top fed into the two connector blocks 9. These are secured by the two screws 3. The other side of the block 9 is connected to the BX or Romex™ cable's wires 10.

Referring to FIG. 7, upper 18 and lower 19 rubber sealing gaskets are illustratively shown, which include features 31 on each gasket that surround the BX cable 2 and the LED array strip 13. The other end of the gasket shows rectangular features 33 that bond close to the cross-sectional shape of the LED light array 13. The top gasket 18 has six locating holes 35 and the bottom gasket 19 has four holes 37. These holes

35, 37 are laced into peg like features 5 in the top and bottom of the case halves (14, 21) to locate and secure the gaskets 18, 19.

Figure 8:
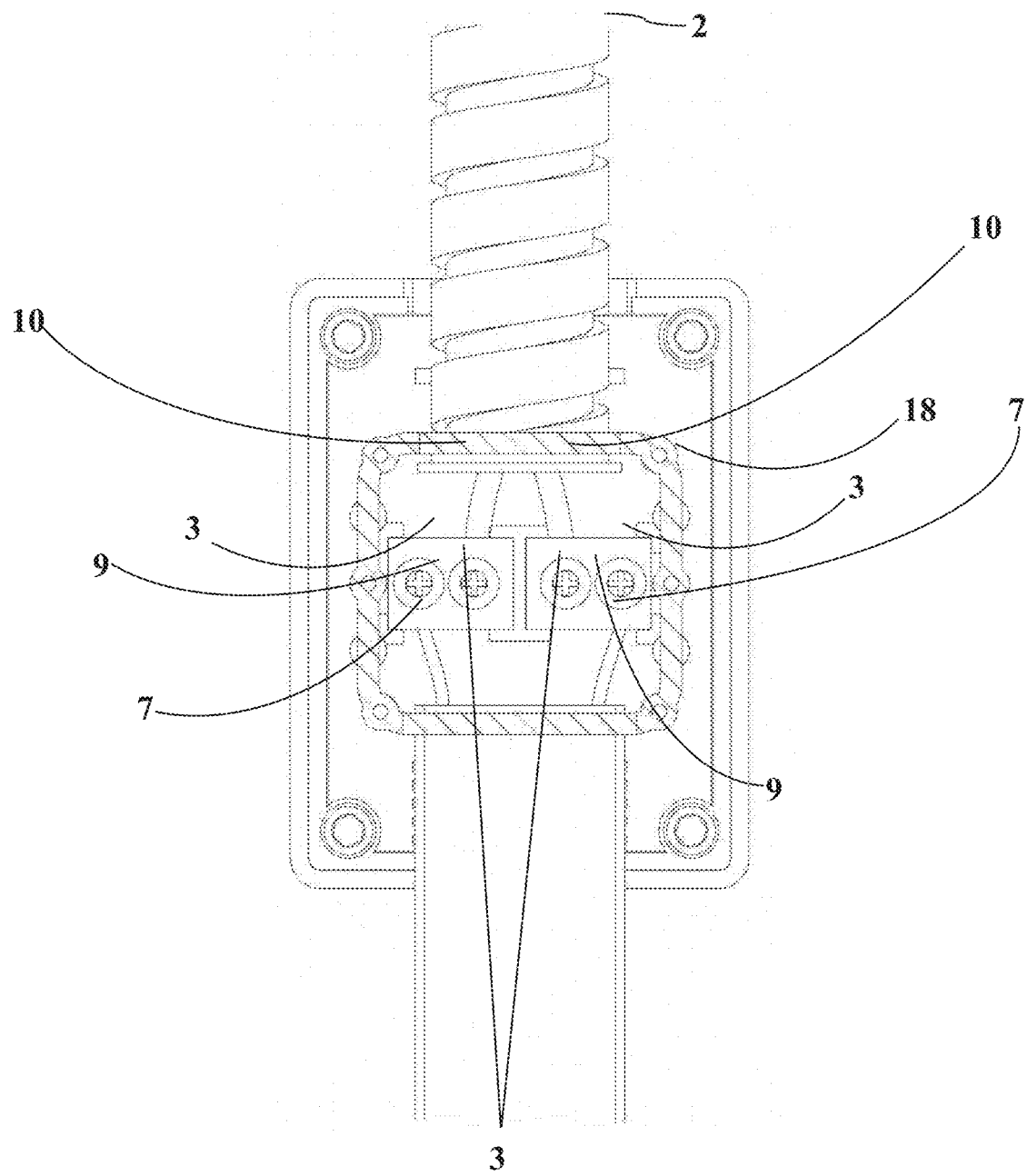
FIG. 8 is a top view of the straight angle entry version of the junction box of FIG. 1 with the cover removed in accordance with one embodiment.

Referring to FIG. 8, a top view of the interior of the box 1 of FIG. 5 is shown. The two wires 7 from the LED light array 13 go into the outside two holes of the two connection blocks 9. The two inside wires 10 from the BX cable 2, go into the two inner holes and get secured by screws 3 on each block. The upper gasket 18 on the top of the BX cable 2 and the top of the LED light array 13 form a water tight seal.

Figure 9:
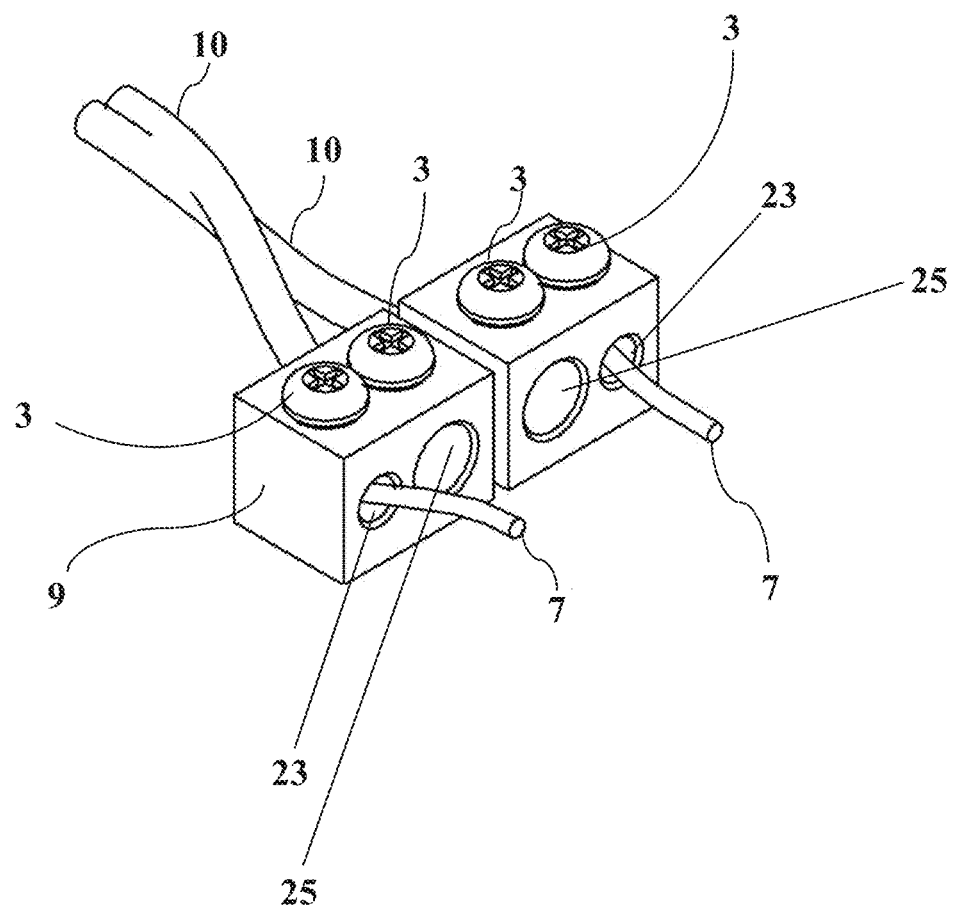
FIG. 9 is a perspective view showing connection blocks for securing wires in accordance with one embodiment.

Referring to FIG. 9, the connection blocks 9 are shown in greater detail. Threaded screw holes for screws 3 clamp the wires 10 and 7, which enters the block perpendicularly to the axis of the screws 3. The wire 10 from the Romex™/BX cable (2) enters in one of the holes 25 and the wires 7 from the LED array (13) enters the other hole 23. When the block is closed, features 17 located on the bottom of the box 1 position or locate the blocks 9 (see FIG. 11). These blocks 9 can be made custom for different wire sizes and can be assembled when the box is prepared for shipping. In this way, the blocks 9 can be interchangeable to provide for different wiring configurations and wiring sizes. In addition, in some implantations of the invention, the screws can be eliminated and the holes where the wires go in can be fabricated for locking insertion, similar to the holes on duplex outlets, where wires get inserted into the holes and self-lock.

Figure 10:
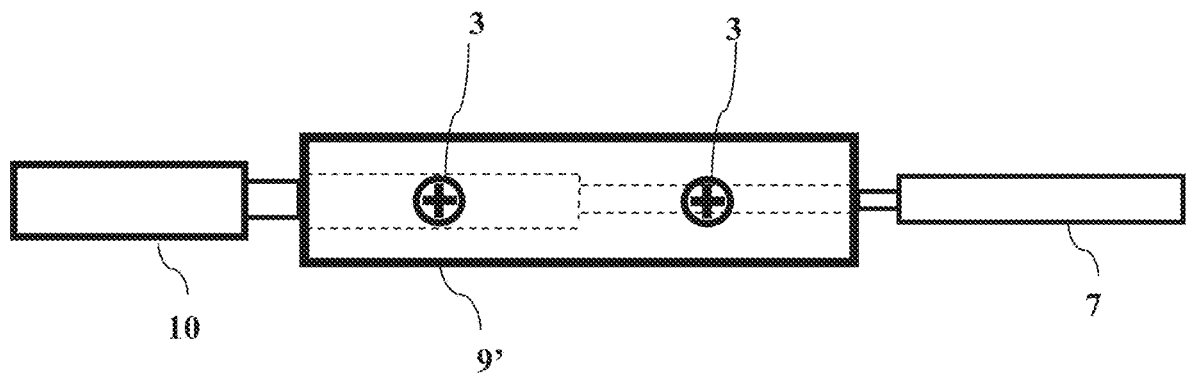
FIG. 10 is a top view showing a connection block for securing wires in accordance with another embodiment.

Referring to FIG. 10, an alternative approach to the design of the block 9 in the event that a longer, but thinner package is desired is illustratively shown. A block 9' is longer and thinner for this approach. There is a thicker hole drilled through to permit securing of the stripped wire 10 from the BX cable 2. Coaxial to that hole is a smaller diameter hole drilled halfway through for the wire from the LED array 7. There are still two blocks 9' that are electrically separated from each other that will be employed in a junction box.

Figure 11:
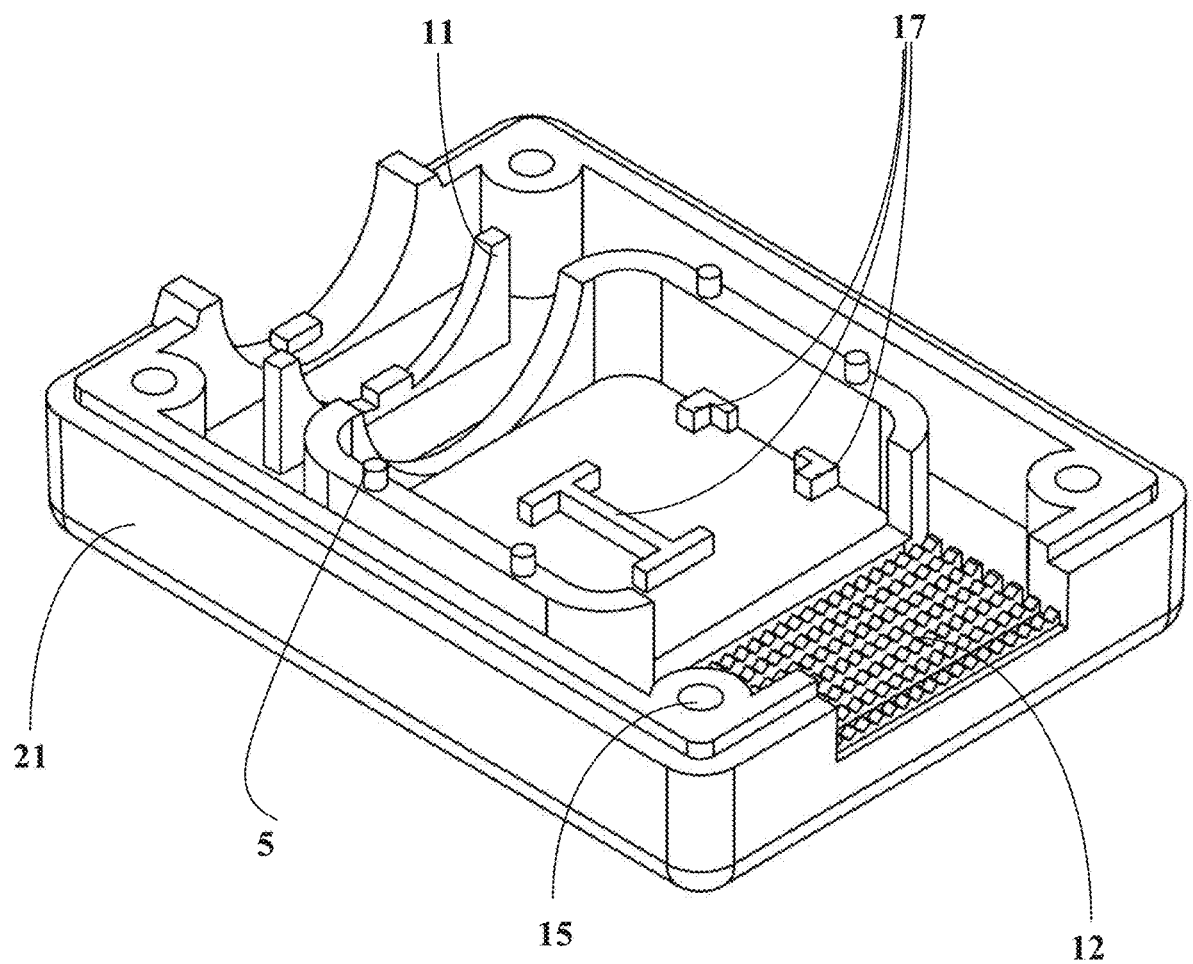
FIG. 11 is a perspective view showing a bottom half of the straight junction box of FIG. 1 in accordance with one embodiment.

Referring to FIG. 11, the bottom half of the box 14 is shown without the wiring and blocks. There is a part of the bottom 21 with a very coarse surface 12 that is employed to add friction and retain the LED light strip. This surface can include ridges, peaks and valleys or other contours or roughnesses as needed to prevent pull out of the LED light strip. The four holes 15 for screws that seal the top to the bottom are shown. On the bottom piece there are four pegs 5 that are used to position and retain the bottom rubber gasket (19). There is a semicircular feature on the box's bottom 11 that is used to hold the BX cable. There are a group of features on the bottom, center of the box 17 that retain the two connector blocks 9 in place. These blocks are not shown in FIG. 11.

Figure 12:
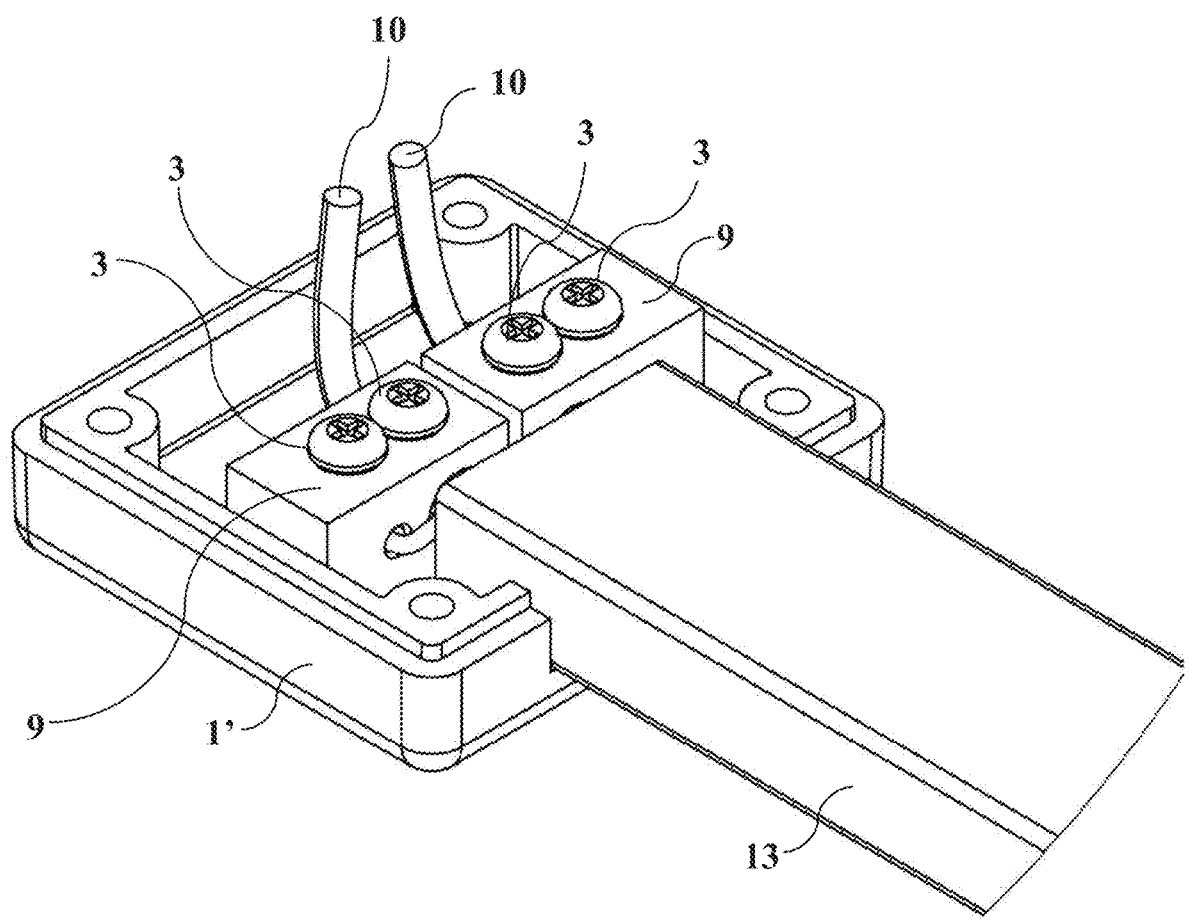
FIG. 12 is a perspective view showing a bottom half of the right angle junction box of FIG. 2 in accordance with one embodiment.

Referring to FIG. 12, an inside view of the box 1' for the version where the BX cable penetrates at right angles to the LED array 13. Each block 9 can be seen. Each block has a screw 3 for the cable wires 10 and another screw 3 for the wires 7 from the LED array 13. The wires 10 that go up into the BX cable are shown and will have a right angle bend.

Figure 13:
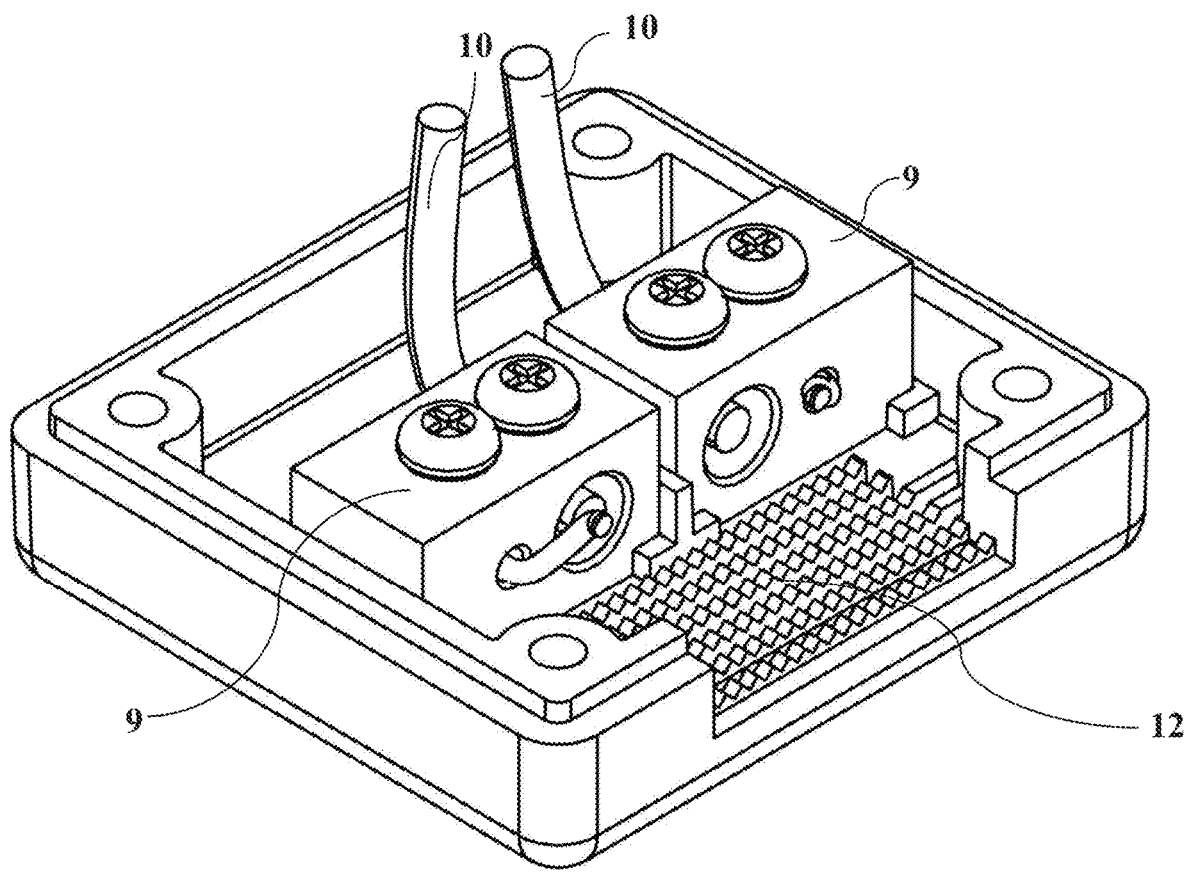
FIG. 13 is a perspective view showing the bottom half of the box for the right angle junction in accordance with one embodiment.

Referring to FIG. 13, the bottom of the box 1' for the right angle embodiment is illustratively shown with the LED array removed with a friction area 12 clearly visible.

The present embodiments connect a power cable, such as an armored BX cable or plastic sheathed Romex™ cable to smaller gauge power input wires of a linear array of LEDs. In one embodiment, the connection of the power source to the lighting fixture can easily be done in the field by an electrician or other individual. The design of this Micro-Junction-Box facilitates the connection of the heavy power cable with the lightweight wires that go to the linear array in a safe and secure manner. The small junction box is useful since it takes up a minimum of physical space and can easily be concealed and provides for making a strong, secure mechanical/electrical connection of the two different sized wires that are enclosed in a small, protective plastic (or metal) box that provides isolation from the prevailing environment from dust particles and liquids. There are two main geometries described herein; however other geometries are contemplated (e.g., 45 degree angle, etc.). One geometry is where the cable enters perpendicular to the plane of the array; the other is where the power cable entry is parallel to the array and enters near the centerline of the end of the linear light array. The concept of a connection block insert that can come in different models, each one designed for different input cable wire size, is included. The connection blocks can be secured to the bottom of the junction box be a snap-in design, screws or other fasteners, adhesive, magnetic connections or any other securing mechanism(s).

Figure 14:
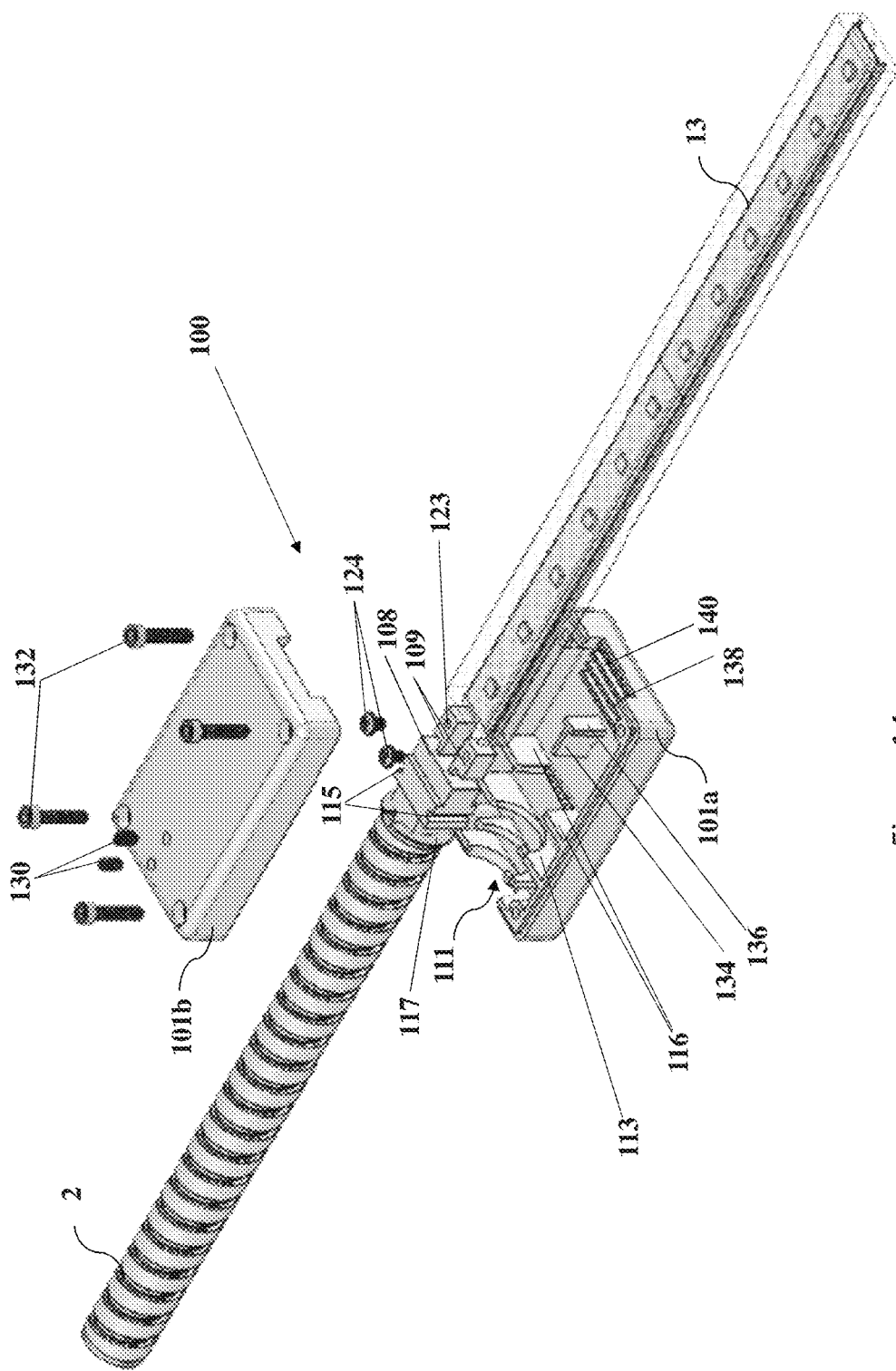
FIG. 14 is an exploded perspective view showing a split half of a straight junction box in accordance with another embodiment.

Referring to FIG. 14, an exploded view of another junction 100 in accordance with another embodiment is shown in a straight or parallel mounting configuration. At the end of the cable 2, a cable termination 108 is employed to terminate sharp ends of the cable 2 and prevent injury or damage to the inside of a junction box 101a, 101b. The BX cable 2 rests on a semi-circular feature 111 of a box bottom 101a that provides a firm mount for the cable 2. There are two conductive (e.g., metal) blocks 109 that are attached to the termination 108 and connect to the wiring from the LED lighting strip 13. There is a hole 123 in each of these blocks 109 for wire insertion or the LED lighting strip 13. The blocks 109 terminate each cable wire of the BX cable 2 and the hole 123 receives a screw 124 that supports the wire from the LED lighting strip 13 to retain the wires of the LED lighting strip 13 and connect the wires of the LED lighting strip 13 to the wires of the BX cable (blocks 109).

A metal outer portion of the BX cable 2 is received in the semi-circular feature 111 of the bottom 101a. A similar feature (111) can be present in the top portion 101b. The semi-circular feature 111 can include one or more walls 113 that can correspond to features 117 of the BX cable 2 or the termination 108. The termination 108 can include locator slots 115 that engage with walls 116 to locate the termination 108 within the bottom 101a. The termination 108 preferably includes a plastic while the blocks 109 are conductive. The walls 116, 113 and the box 101a, 101b can be formed from plastic or other non-conductive materials.

A protrusion 134 is formed, e.g., integrally, in the box bottom 101a. The protrusion 134 is employed to separate the two blocks 109 and prevent connections between them during operation. The protrusion 134 includes a cross-bar section 136 that assists in locating a position of the blocks 109 relative to one another and also acts like a stop for axial placement of the blocks 109 and the axial placement of the LED strip lighting 13 relative to the blocks 109. For example, when attempting to join the LED lighting strip 13 to the junction box 101a the strip 13 is fed into an opening 138 (in the top 101b and the bottom 101a). A non-continuous surface (gripping surface) 140 assists in providing a gripping force on the strip 13 when the halves of the top 101b and the bottom 101a are joined. The cross-bar 136 prevents the strip from moving axially forward by blocking the strip 13 and preventing shorting issues.

The top and bottom halves of the box (101a, 101b) can be joined and secured by screws 132 or other securing mechanism. This causes the gripping surface to engage the LED lighting strip 13 and captures the BX cable 2. The BX cable 2 can be further secured using set screws 130 or other securing mechanism. A gasket (not shown) can be employed between the halves 101a and 101b to seal the junction box (101a, 101b).

Figure 15:
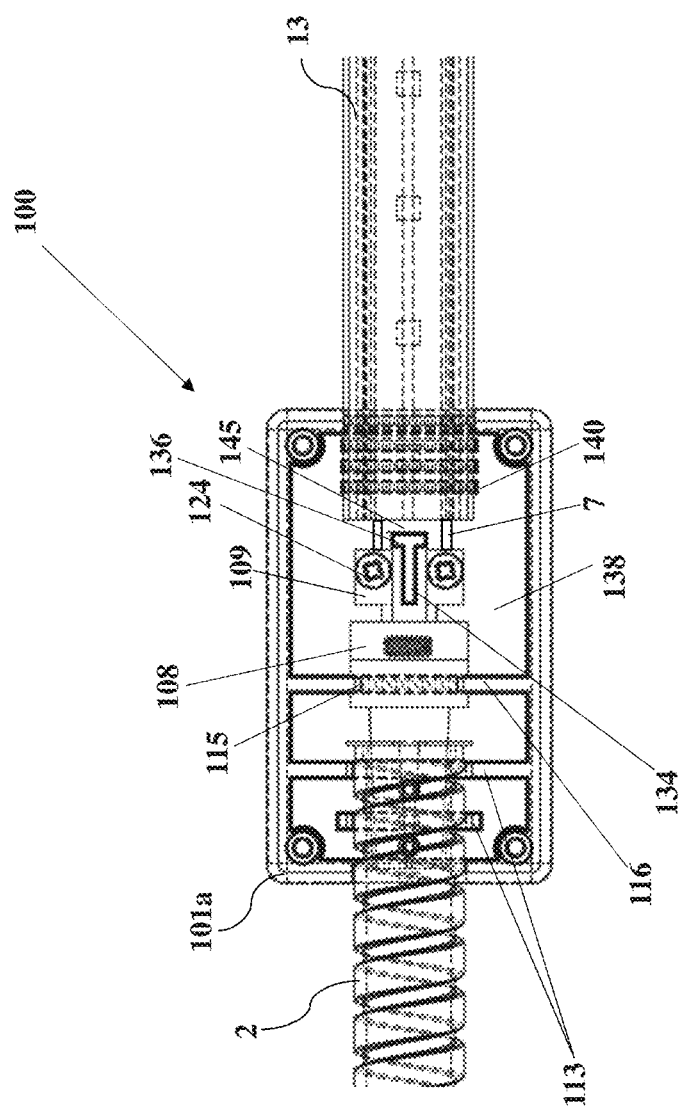
FIG. 15 is a top view showing a bottom half of the straight junction box of FIG. 14 in accordance with an embodiment.

Referring to FIG. 15, the junction 100 is shown assembled in the straight or parallel mounting configuration. The BX cable 2 is secured in semi-circular features 113 and termination 108 is indexed and secured in its slots by walls 116. Blocks 109 are connected to the BX cable wires and secured and separated by the protrusion 134. The protrusion 134 can include a height that is above the connection blocks 9, 109 or can be below the connection blocks 109. In some embodiments, the connection blocks 109 can move relative to each other. In such cases, the protrusion 134 (e.g., a connection block receiving-feature), which forms an insulation wall between the connection blocks 109 is preferably the same height to taller than the connection blocks 109 to prevent shorting if the blocks can pivot toward one another.

Screws 124 connect and secure wires of the LED lighting strip 13 to the blocks 109. It should be understood that the blocks 109 can be connected by solder, quick connect, crimp or any other suitable electrical connection to the wires of the BX cable 2. Blocks 109 can be interchangeably connected directly on the wire (e.g., BX cable wire) or directly on a crimp or conductive wire covering to provide versatility. The material of the cross-bar 136 provides a minimum acceptable gap 145 between the end of the LED lighting strip 13 and the blocks 109.

It should be understood that the connection blocks 9, 109 can accommodate multiple wires in each opening/hole. A corresponding screw (e.g., screws 123) can be employed to hold one or more wires in place. In other embodiments, individual holes and screws are provided for each individual wire. In still other embodiments, the blocks 9, 109 can include a hole for receiving a wire and a second wire may be placed and secured under the screw head.

Figure 16:
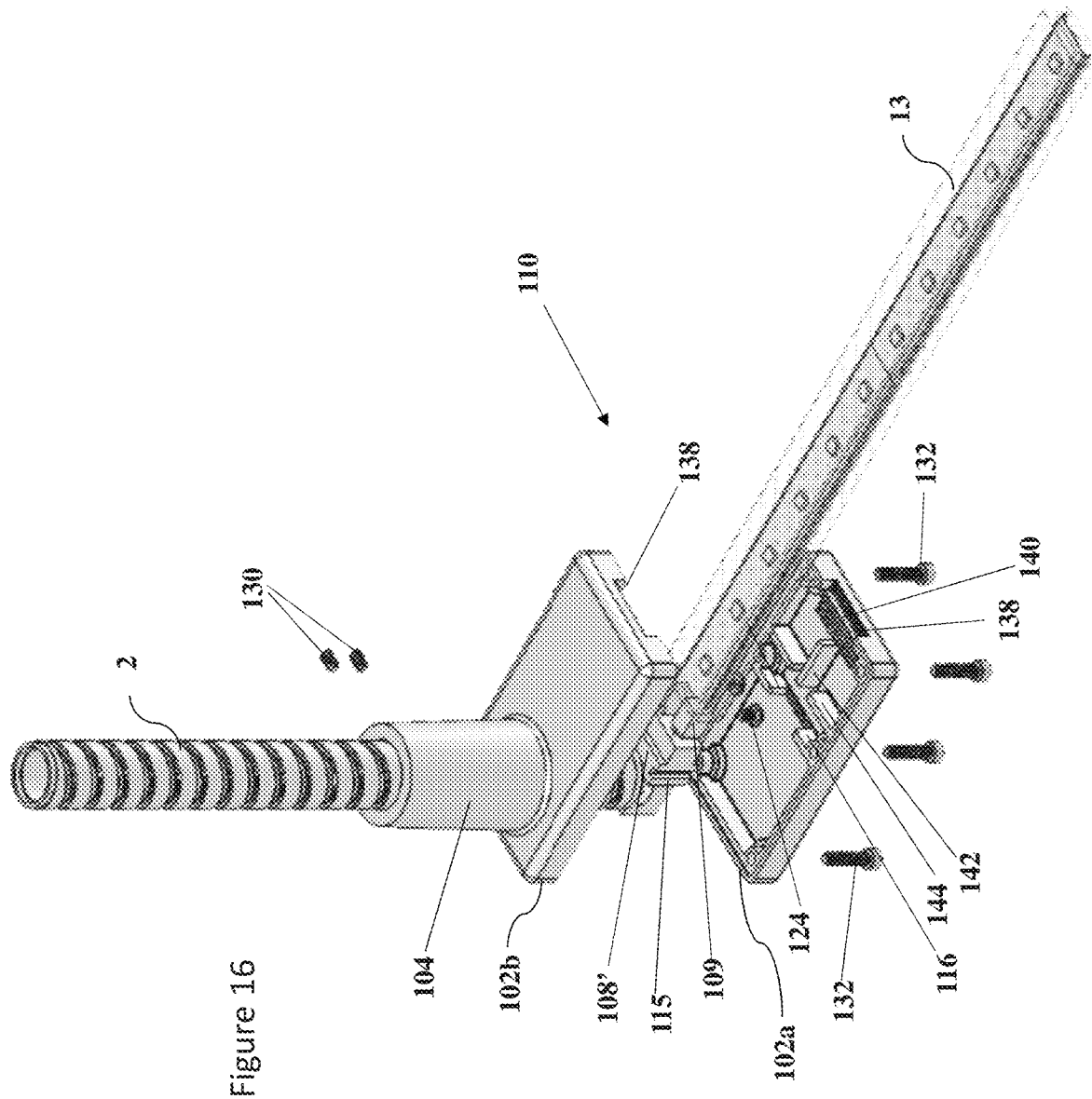
FIG. 16 is an exploded perspective view showing a right angle junction in accordance with another embodiment.

Referring to FIG. 16, an exploded view of a right angle entry embodiment is illustratively shown in accordance with another embodiment. The cable 2 enters box 102a, 102b using a bushing 104 (e.g., plastic) that acts as a strain relief. Two securing screws 130 can be employed to lock the BX cable 2 to the bushing 104. As in FIGS. 14 and 15, the spacing of these two screws 130 are set so that they go into a bottom grooving of the BX cable, which gives the cable strong retention capability. This version also illustratively includes four screws 132 to tightly lock the top 102b and bottom 102a of the box together. Other securing mechanisms (e.g., snap fit, etc.) can also be employed.

At the end of the cable 2, a cable termination 108' is employed to terminate sharp ends of the cable 2 and prevent injury or damage to the inside of a junction box 102a, 102b. In this embodiment, the termination 108' is oriented at a substantially right angle with a longitudinal axis of the BX cable 2. The termination 108' includes a portion to receive the BX cable 2 and can include features (111) to secure the termination to the end of the BX cable 2. The BX cable 2 is received in the termination 108' which can include semi-circular features (111) to clamp on the BX cable 2. The box top 102b provides a firm mount for the cable 2. There are two conductive (e.g., metal) blocks 109 that are attached to the termination 108' and connect to the wiring from the LED lighting strip 13. There is a hole (not shown, facing down) in each of these blocks 109 for wire insertion or the LED lighting strip 13. The blocks 109 terminate each cable wire of the BX cable 2 and each hole in the blocks 109 receive a screw 124 that supports the wire from the LED lighting strip 13 to retain the wires of the LED lighting strip 13 and connect the wires of the LED lighting strip 13 to the wires of the BX cable (blocks 109).

The termination 108' can include locator slots 115 that engage with walls 116 to locate the termination 108 within the bottom 102a. The termination 108' preferably includes a plastic while the blocks 109 are conductive. The walls 116, 142, 144 and the box 102a, 102b can be formed from plastic or other non-conductive materials. Walls 142 and 144 can be employed to locate blocks 109 and provide axial gapping and registration between termination 108' and the blocks 109, as well as provide a minimum gap between the strip 13 and the blocks 109.

The walls or protrusions 142 and 144 can be formed, e.g., integrally, in the box bottom 102a. The walls or protrusions 142 and 144 can be employed to separate the two blocks 109 and prevent connections between them during operation. The walls or protrusions 142 and 144 assist in locating a position of the blocks 109 relative to one another and also act like a stop for axial placement of the blocks 109 and the axial placement of the LED strip lighting 13. For example, when attempting to join the LED lighting strip 13 to the junction box 102a the strip 13 is fed into an opening 138 (in the top 102b and the bottom 102a). A non-continuous surface (gripping surface) 140 assists in providing a gripping force on the strip 13 when the halves of the top 102b and the bottom 102a are joined. The wall 142 prevents the strip from moving axially forward by blocking the strip 13 and preventing shorting issues.

The top and bottom halves of the box (102a, 102b) can be joined and secured by screws 132 or other securing mechanism. This causes the gripping surface to engage the LED lighting strip 13. The BX cable 2 can be further secured using set screws 130 or other securing mechanism. A gasket (not shown) can be employed between the halves 102a and 102b to seal the junction box (102a, 102b).

It should be understood that while the LED lighting strip 13 and BX cable 2 are described as particularly useful embodiments, the present embodiments can be employed as junctions between any types of cables, e.g., Romex™, armored cables, etc. It should also be understood that the cable scan include a DC to DC junction, and AC to AC junction or an AC to DC junction. The junctions in accordance with aspects of the invention provide for flexibility in the types of cables employed and ensure easier and more reliable connections between the cables. For example, the blocks or terminals 9, 109 can easily be switched out to accommodate different cable sizes or other constraints. In addition, the blocks or terminals can be provided to accommodate different screw sizes for the opposing cable connections. In still other embodiments, the block and corresponding screws can be replaced with other types of terminals, such as quick connection type connectors, etc. mounted on the blocks 9, 109.

In other embodiments, the junction boxes can be employed with more than two cable connections. The cable connection can all be in parallel, all be right angle or be a combination thereof.

Figure 17:
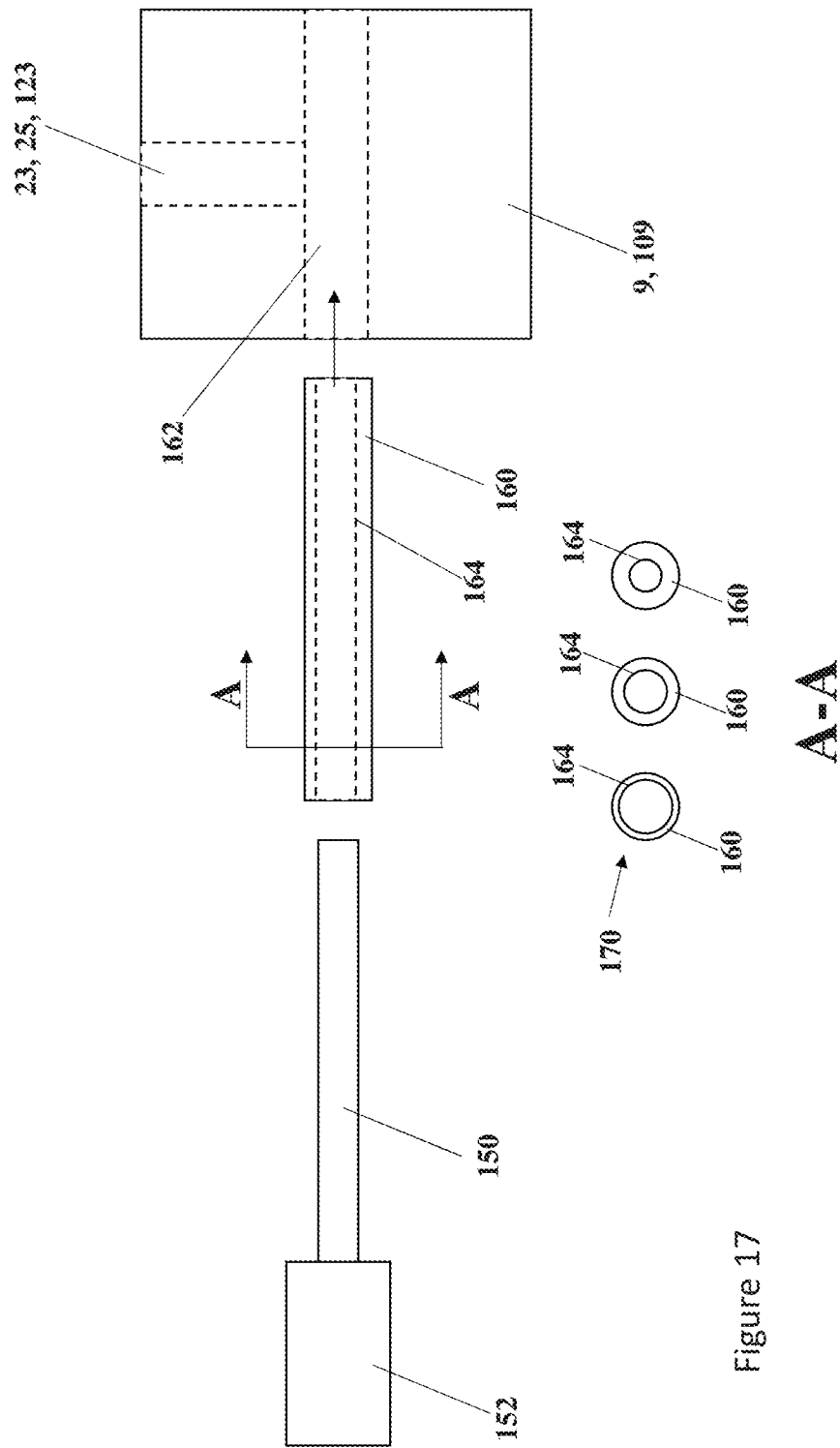
FIG. 17 is a side schematic view showing the use of ferrules to accommodate different wire sizes in connection blocks in accordance with another embodiment.

Referring to FIG. 17, metal blocks 9 or 109 can be fabricated for a specific size of the BX, Romex™ or other cable that will be encountered. In one embodiment, different blocks 9. 109 sizes can be employed to accept the different wire gauges being employed, e.g., for BX, Romex™, LED wires, other cables, etc. In FIG. 17, an alternate embodiment is depicted. A hole in the block 109 can include one size for receiving wires 150 of different sizes by providing ferrules 160 of different inside diameter but the same outside diameter. The ferrules 160 can slide over the wire and be crimped, soldered or otherwise attached. The ferrule 160 can be formed from a soft metal, such as a tubular piece of copper over the cable's wire 150 when a lighter cable gauge is used. This ferrule 160 can be crimped to the cable's wire 150 as a block fastening screw secured within in hole 23, 25 or 123 is tightened down. One block size would be needed and a supply of different ferrules can be provided to customize the block 109 to the size of the wire 150. Detail 170 shows different cross-section of ferrules 160 taken at section line A-A. Each ferrule 160 has the same outside diameter and a different inside diameter 164 to accommodate different wires gauges.

Both the wires from the LED array and/or the wires from the BX cable can be processed in this way. The wires 150 can be cut to a pre-determined length and stripped of their insulation 152 by a pre-determined amount. A cable termination cap or ferrule 160 can be placed over the end of the cable on a roughly trimmed metallic sheath's edge of the cable. Screws on the connection block through hole 123 can be backed out to permit for entry of the stripped wire 150 or ferrule 160 in the connection block 109. The LED array can be put into one entry opening and the LED array wires can be placed into other holes of two connection blocks. Fastening screws (not shown) can be tightened to secure the cable wires. The ferrules 160 can be employed for each cable type and can be employed in the holes of single-hole connection blocks, double-hole connection blocks, etc.

Having described preferred embodiments for power cable micro-junction-boxes for a strip light array (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A junction box, comprising:
 a bottom portion;
 a top portion configured to mate with the bottom portion, the top and bottom portions forming a first opening to receive a first cable and forming a second opening to receive a second cable; and
 interchangeable connection blocks secured in the bottom portion to make connections between the first cable and the second cable, wherein the connection blocks include at least two holes, each of the at least two holes having a different size, for receiving wires of different gauges.

2. The junction box as recited in claim 1, wherein the first and second cables are received within the junction box in a parallel direction relative to each other.

3. The junction box as recited in claim 1, wherein the first and second cables are received within the junction box at an angle relative to each other.

4. The junction box as recited in claim 1, wherein at least one of the first cable and the second cable includes a power cable.

5. The junction box as recited in claim 1, wherein the interchangeable connection blocks are removable and replaceable to accommodate different sets of wire gauges.

6. The junction box as recited in claim 1, further comprising one or more gaskets formed between the bottom portion and the top portion.

7. The junction box as recited in claim 6, further comprising pegs on at least one of the bottom portion and the top portion for locating and securing the one or more gaskets.

8. The junction box as recited in claim 1, further comprising a friction retainer pad formed on at least one of the bottom portion and the top portion to engage the first or second cable.

9. The junction box as recited in claim 1, wherein the first opening includes a strain relief for the first cable.

10. The junction box as recited in claim 1, wherein the first opening includes a friction clamp.

11. The junction box as recited in claim 1, further comprising an integrally formed protrusion that forms an insulation wall between the connection blocks.

12. The junction box as recited in claim 1, further comprising an integrally formed protrusion that ensures a gap between one of the first or second cable and the connection blocks.

13. The junction box as recited in claim 1, wherein the wire openings include through holes for receiving at least one cable wire.

14. The junction box as recited in claim 13, wherein the connection blocks include a screw configured to crimp the at least one cable wire in a corresponding connection block.

15. The junction box as recited in claim 13, wherein the connection blocks include a screw configured to crimp a ferrule in a corresponding connection block.

16. The junction box as recited in claim 13, wherein the through holes in the connection blocks receive a ferrule fitted on the at least one cable wire, wherein the ferrule includes an inside diameter configured to accommodate a size of the at least one cable wire.

17. A junction box comprising;
 a bottom portion;
 a top portion configured to mate with the bottom portion, the top and bottom portions forming a first opening to receive a first cable and forming a second opening to receive a second cable;
 interchangeable connection blocks secured in the bottom portion to make connections between the first cable and the second cable;
 one or more gaskets formed between the bottom portion and the top portion; and
 pegs on at least one of the bottom portion and the top portion for locating and securing the one or more gaskets.

18. The junction box as recited in claim 17, wherein the interchangeable connection blocks are removable and replaceable to accommodate different sets of wire gauges.

19. The junction box as recited in claim 17, further comprising an integrally formed protrusion that forms an insulation wall between the connection blocks.

* * * * *